March 27, 1962     B. A. SPINDLER     3,026,844
DOG HOUSE
Original Filed March 19, 1959     2 Sheets-Sheet 1

INVENTOR.
BERNARD A. SPINDLER
BY
Gustave Miller
ATTORNEY

March 27, 1962 B. A. SPINDLER 3,026,844
DOG HOUSE

Original Filed March 19, 1959 2 Sheets-Sheet 2

INVENTOR.
BERNARD A. SPINDLER
BY
Gustave Miller
ATTORNEY

United States Patent Office 3,026,844
Patented Mar. 27, 1962

3,026,844
DOG HOUSE
Bernard A. Spindler, R.D. 2, Marietta, Ohio
Original application Mar. 19, 1959, Ser. No. 800,420, now Patent No. 2,987,043, dated June 6, 1961. Divided and this application Jan. 30, 1961, Ser. No. 85,705
2 Claims. (Cl. 119—19)

This is a division of my application Serial No. 800,420 filed March 19, 1959, allowed December 5, 1960, and issued as Patent No. 2,987,043 on June 6, 1961.

This invention relates to a dog house, and it particularly relates to a dog house which is also utilizable as a tethering means for holding the dog while permitting it to freely exercise.

Most dog houses were previously constructed of heavy material such as wood or the like which were difficult and clumsy to move about from one location to another. They were also cold in the winter and hot in the summer and were subject to rapid deterioration by the weather, which deterioration affected both their appearance and their utility. They were also difficult to keep clean and when a dog chain was connected thereto, it often became tangled therearound by movements of the dog tied to the chain.

It is one object of the present invention to overcome the above and other disadvantages by providing a dog house which is light in weight, weather-resistant, compact, heat insulatable, neat in appearance and easily kept clean.

Another object of the present invention is to provide a dog house, of the aforesaid type, which requires little maintenance and has long life.

Another object of the present invention is to provide a dog house having tethering means which enables the dog to move freely without any tangling or hang-up of the chain.

Other objects of the present invention are to provide an improved dog house, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
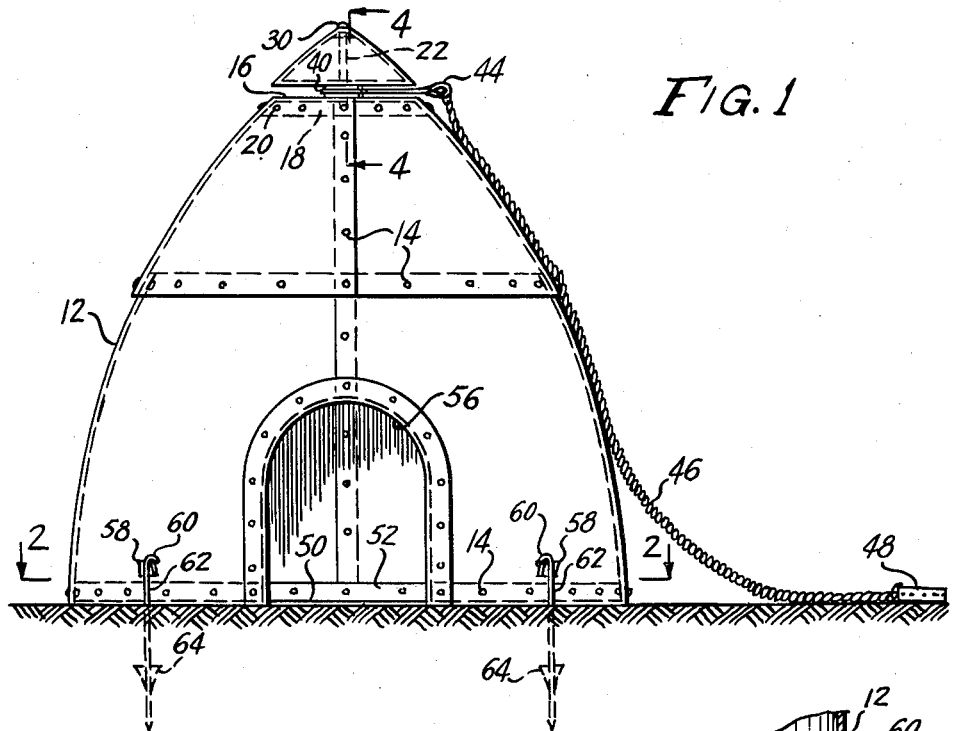
FIG. 1 is a side elevational view of a dog house embodying the present invention.
Figure 3:
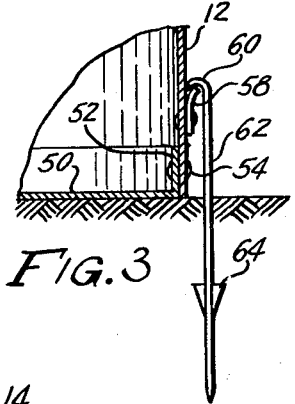
FIG. 3 is a sectional view taken on line 3—3 of FIG. 2.
Figure 2:
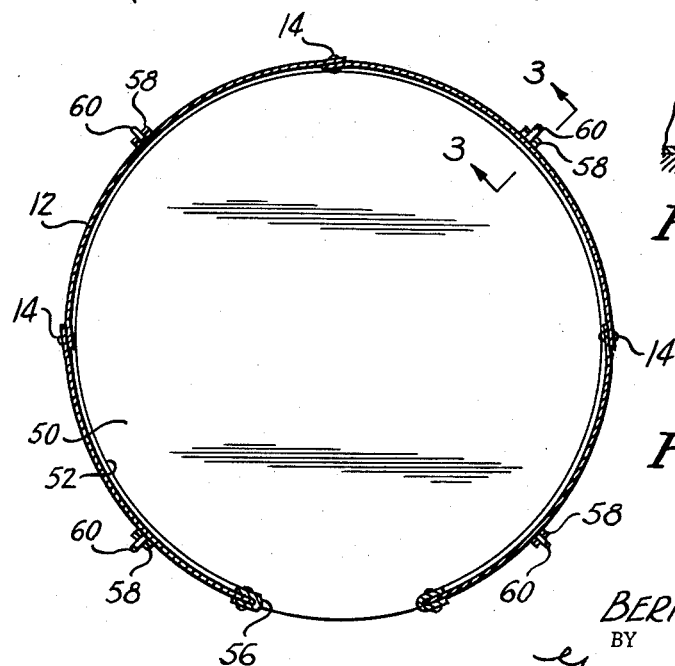
FIG. 2 is a sectional view taken on line 2—2 of FIG. 1.
Figure 4:
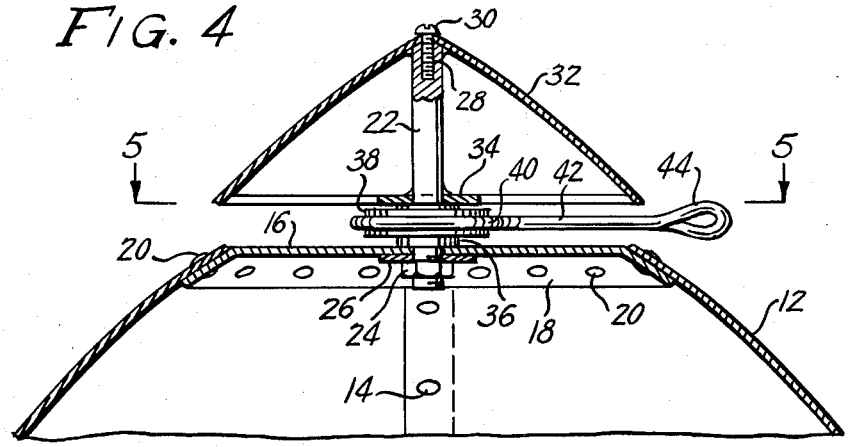
FIG. 4 is a sectional view taken on line 4—4 of FIG. 1.
Figure 5:
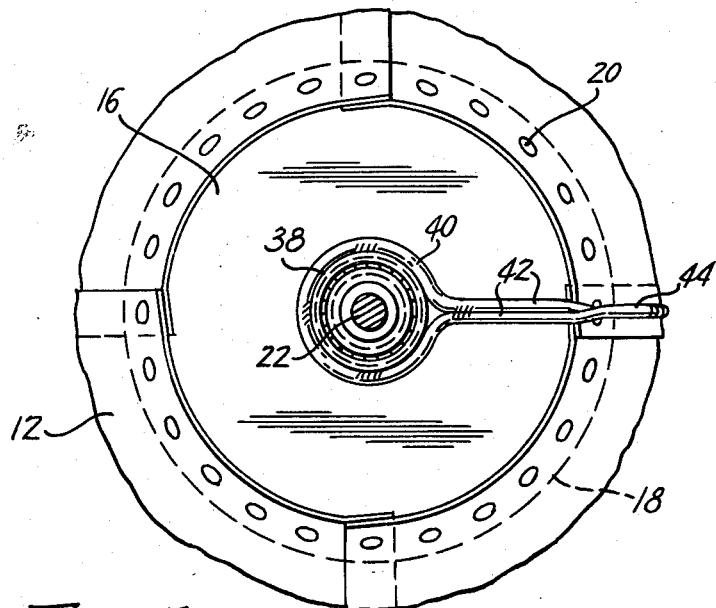
FIG. 5 is a sectional view taken on line 5—5 of FIG. 4.

Referring in greater detail to the drawings wherein similar reference characters refer to similar parts, there is shown a dog house, generally designated 10, comprising a hollow body or housing 12 of semi-elliptical shape, truncated at the top. The body 12 is formed of aluminum plates, fiber glass sheets or other suitable material riveted together, as at 14.

The truncated top is closed by an aluminum plate or fiber glass sheet 16 having a flange 18 around its periphery. The flange 18 is outwardly tapered to conform with the curvature of the body 12 adjacent the truncated top. The flange 18 is also received within the top of the body 12 and is secured therein by rivets 20.

The plate 16 is apertured at its center to receive the lower end of a rod 22. This lower end is screw-threaded to receive a lock nut 24 which bears against a heavy washer 26 surrounding the rod 22. The washer 26 is thereby secured between the nut 24 and the undersurface of the cover plate 16, locking the lower end of rod 22 in place on the plate 16.

The upper end of rod 22 is provided with an internally-threaded bore 28 adapted to receive a screw 30 by means of which a canopy 32 is secured to the upper end of the rod 22. The canopy 32 is hollow and of generally conical shape and of a size which gives it the appearance of a nose cone at the top of body 12. The apex of the canopy 32 is apertured to receive screw 30.

The bottom of canopy 32 is open but is traversed by cross-bars 34 apertured at the center to receive the rod 22. The rod 22 holds the canopy spaced from the top plate 16 and in this space the rod 22 is provided with a bushing 36 supporting a ball bearing 38 on which is mounted a ring 40 provided with lateral arms 42 at one end of which is formed an eyelet 44. The ring 40, arms 42 and eyelet 44 form a swivel-type hanger. To this eyelet 44 is secured one end of a chain 46, the other end of which is connected to a dog collar 48.

The lower end of the semi-spherical body 12 is closed by an aluminum plate or fiber glass sheet 50 having a peripheral flange 52 internally positioned within the bottom of the body 12 and secured thereto by rivets 54. A door 56 is provided at one portion of the body 12 adjacent the bottom thereof and extending to almost the center thereof.

Adjacent the bottom of the body 12 are provided a plurality of eyelets 58, four being here illustrated; these eyelets 58 being adapted to receive the hooked upper ends 60 of corresponding anchor stakes 62. These anchor stakes 62 are each provided adjacent their lower pointed ends with fins 64 adapted to firmly anchor the stakes in the ground.

The above-described dog house is light in weight because of its aluminum construction and easy to carry because of its compact, curved contour as well as its lack of weight. It also reflects light thereby acting as a heat insulator, and can additionally be coated on its inner surface with heat and cold insulation layers. Its aluminum construction makes it weather resistant, and retains its appearance. It is also easy to keep clean and maintain in good condition.

A dog having the collar 48 attached thereto has a large amount of freedom of movement because of the swivel action of ring 40. This swivel action plus the smooth, curved contour of the dog house itself, prevents the chain becoming snarled or tangled.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A dog house comprising a semi-elliptical housing having a broad base and a relatively narrow truncated top, a top plate closing said top, a bottom plate covering said base, a dog door in said housing adjacent said base, and means adjacent the base of said housing comprising spaced eyelets on said housing adjacent its base and cooperating hooked anchor stakes for releasably holding said housing secured to the ground.

2. A dog house comprising a hollow, curved housing circular in horizontal cross section, having a broad base and a relatively narrow truncated top, a door in said housing, a top plate covering said top and a bottom plate covering said base, the base of said housing being releasably secured to the ground by a plurality of anchor stakes, each of said stakes having a hooked upper end insertable in a corresponding eyelet on said housing adjacent its base, a pointed lower end, and fins intermediate its ends to anchor the stake in the ground.

References Cited in the file of this patent

UNITED STATES PATENTS

| | | |
|---|---|---|
| 828,905 | Stevens | Aug. 21, 1906 |
| 970,873 | Bear | Sept. 20, 1910 |
| 1,701,337 | Prange | Feb. 5, 1929 |
| 2,145,991 | Nichols | Feb. 7, 1939 |